3,553,119
EPOXY RESIN ESTER PRODUCTION
Howard J. Wright, Kansas City, Mo., and Joseph H. Scherer, Shawnee Mission, Kans., assignors to Cook Paint & Varnish Company, Kansas City, Mo., a corporation of Delaware
No Drawing. Filed Dec. 18, 1968, Ser. No. 784,915
Int. Cl. C09d 3/58
U.S. Cl. 260—18　　　　　　　　　　　　　5 Claims

---

ABSTRACT OF THE DISCLOSURE

An improvement in the process for the production of epoxy resin esters by (1) esterifying the water and sodium chloride containing reaction product of epichlorohydrin and bisphenol A with a fatty acid, (2) distilling off water during esterification, (3) reducing the product with a solvent for the ester, and (4) removing sodium chloride by-product in granular form. The process gives an ester characterized by lighter color and other improved qualities.

---

This invention relates to epoxy resin esters. More particularly, the invention is concerned with the provision of a novel process for making epoxy resin esters.

It is known to produce epoxy resin esters by reacting a relatively high molecular weight epoxy resin, for example Shell's Epon 1004 (mol. wt., 1740–2050), with a fatty acid or mixtures thereof. However, such a process is expensive due to the relatively high cost of the epoxy resin starting material. A somewhat less costly process for preparing epoxy resin esters, which is also known, involves reacting a lower molecular weight epoxy compound, notably epichlorohydrin, with bisphenol A or the like in the presence of excess caustic, isolating the resulting product, which is a liquid epoxy similar, for example, to Epon 828 (mol. wt., 370–400) and then reacting this liquid epoxy with more bisphenol A to build up the molecular weight and fatty acid for the esterification. In this latter process, sodium chloride is formed as a by-product in the preparation of the liquid epoxy and is removed by extensive washings followed by drying of the liquid epoxy product before further reaction with bisphenol A and esterification to obtain the desired epoxy resin ester. These washing and drying steps make the process cumbersome and time consuming and the final ester product is usually undesirably colored due apparently to the presence of sodium chloride or other impurity.

The principal object of the present invention is to provide a process for preparing epoxy resin esters which are free from the above noted disadvantages of prior procedures. A more specific object of the invention is to provide a process for making epoxy resin esters from epichlorohydrin and bisphenol A followed by esterification with fatty acid, without the tedious and time consuming washing and drying of the bisphenol A-epichlorohydrin intermediate previously required, to thereby give a product of generally better color and other properties than hitherto possible. Other objects will also be hereinafter apparent.

Broadly stated, the objects of the invention are realized by the provision of a process which involves mixing together epichlorohydrin and bisphenol A or the like, and adding thereto sodium hydroxide, preferably as an aqueous solution, the hydroxide being added gradually to the mixture with cooling to keep the temperature within the desired range. Usually, the epichlorohydrin and bisphenol A are mixed together at elevated temperature, generally in the range of 70–80° C., although temperatures outside this range may be used, e.g. 30–100° C.

The total amount of sodium hydroxide utilized is usually the stoichiometric amount needed to neutralize hydrogen chloride formed in the reaction or a little less than the stoichiometric amount, e.g. down to about 85–90% of that theoretically needed to neutralize the acid.

After all of the hydroxide has been added to the reaction mixture, usually involving a period of from 15 to 60 minutes, the temperature of the reaction mixture may be elevated or maintianed at, for example, 100° C. for one hour or so to complete the reaction, and then the desired fatty acid or mixture thereof is added, preferably along with a small amount of solvent such as xylene, to improve the workability of the reaction mixture. After the acid has been added, the temperature of the reaction mixture is raised to the point where water is azeotropically removed and the esterification is continued with distillation of water until the desired acid number is attained, usually 7 or below, and preferably below 5, by-product sodium chloride precipitating out in granular form as the reaction proceeds with distillation of water.

After the esterification, the reaction mixture is reduced by addng thereto a solvent for the epoxy resin ester which does not dissolve the precipitated sodium chloride. Xylene is preferred although other solvents for the ester which do not dissolve the sodium chloride may be used. Sufficient xylene or like solvent should be used to dissolve all of the ester and obtain the desired dissolved solids content, the salt being filtered off.

Reactant proportions and other operating conditions can be widely varied and will determine the molecular weight of the ultimate product. For lower molecular weight epoxy products, typically a molecular weight of 350 to 2500, a mol ratio of epichlorohydrin to bisphenol A of 2 or more, e.g. 2.2 to 2.5, should be used while lower ratios below 2:1, e.g. 1.2:1, are generally selected when higher molecular weight resins are desired.

Any fatty acids or mixtures thereof, normally employed for making epoxy resin esters, may be used herein. Preferably, however, there are employed soya fatty acids, rosin acids, safflower oil fatty acids, tall oil acids, linseed oil fatty acids or mixtures thereof. The amount of such acids which is used can be varied but should be enough to give the desired acid number as indicated above.

The results of the invention are unexpected since it could not have been appreciated from prior procedures for preparing epoxy resins that water, and especially sodium chloride by-product, would be so easily removed in the ester preparation. As noted, the water is readily removed by distillation as the process proceeds and, as this occurs, the sodium chloride precipitates out in granular form and remains undissolved when the reaction product is dissolved in xylene or like solvent, so that the salt can be conveniently filtered off. The ester product has a much improved color which is especially surprising because very often the presence of substantial amounts of salt in a high temperature cook tend to cause burning of the resin at the heating surface with consequent darkening of the batch. However, the salt in the present case is in a highly granular form and apparently, because of this, does not contribute to any darkening of the product.

Another unique feature of the process is that undesired foaming does not occur during the cooking operation. This is apparently due to the fact that the addition of the sodium hydroxide is regulated so that it is not in excess with respect to the epichlorohydrin. This avoids the formation of sodium soaps of fatty acids, which are apparently the cause of foaming in this type of reaction.

The invention is illustrated by the following examples, wherein parts and percentages are by weight unless otherwise stated.

EXAMPLE I 37.8 parts bisphenol A and 16.7 parts epichlorohydrin were charged into a reactor and heated to 70–80° C. Thereafter, 6.7 parts sodium hydroxide, dissolved in 6.7 parts water, were gradually added to the reaction mixture over a period of 30 minutes, with heating to 100° C., the temperature of the mixtures then being held at 100° C. for one hour. Thereafter, 31.7 parts soya fatty acids and 5 parts xylene were added. The temperature was raised and water azeotropically distilled off, until the temperature reached 230° C. The mixture was held at this temperature until the acid number reached 5. Sodium chloride precipitated out of the mixture in granular form as the water was removed. When cooking was completed, i.e. when the acid number was about 5, the reaction mixture was reduced with solvent (xylene), whereupon the ester was dissolved leaving the salt in undissolved granular form. After filtering off the salt, the epoxy resin ester reaction product had the following constants:

| | |
|---|---|
| Non-volatiles, percent | 55 |
| Viscosity | T–U |
| Color | 5 |
| Acid number | 5 |

The same ester made by a conventional method, using 60 parts Epon 1004 (Shell) and 40 parts soya fatty acids, had the following constants:

| | |
|---|---|
| Non-volatiles, percent | 55 |
| Viscosity | T–U |
| Acid number | 2 |
| Color | 6–7 |

It will be seen from the above that the product of the present process was significantly lighter.

EXAMPLE II 37.3 parts bisphenol A, 16.6 parts epichlorohydrin and 20 parts methyl isobutyl ketone were charged into a reactor and heated to 80–85° C. Thereafter, 7.2 parts sodium hydroxide, dissolved in 7.2 parts water, were gradually added to the reaction mixture over a period of thirty minutes, the temperature of the mixture being held at 85° C. for one hour. Thereafter, 3.2 parts Unitol DSR (tall oil fatty acids) and 0.06 part lithium naphthenate were added. The temperature was raised and water azeotropically distilled off followed by distillation of methyl isobutyl ketone, until the temperature reached 260° C. 28.44 parts Unitol DSR (tall oil fatty acids) were added and the mixture was held at 260° C. until the acid number reached 3. The reaction mixture was reduced with solvent (xylene) and filtered to remove the salt. The epoxy resin ester reaction product had the following constants:

| | |
|---|---|
| Non-volatiles, percent | 50 |
| Viscosity | Y–Z |
| Color | 6 |
| Acid number | 3 |

As will be understood by those in the art, the ester products of the invention are useful for coating compositions, e.g. pigmented or clear finishes of either the air-dried or baked types.

Having described the invention, what is claimed as new is:

1. A process for the production of an epoxy resin ester which comprises reacting epichlorohydrin and bisphenol A to obtain an epoxy resin mixed with water and sodium chloride by-product, then esterifying the resulting reaction product with fatty acid and without first separating or removing said water and sodium chloride, said esterification being carried out at a temperature sufficient to distill off water while sodium chloride precipitates out in granular form, reducing the esterification reaction mixture after the desired acid number is reached by adding thereto a solvent for the epoxy ester in which sodium chloride is insoluble and separating the sodium chloride granules from the resulting solution.

2. The process of claim 1 wherein said solvent is xylene and the sodium chloride is separated from the solution by filtering.

3. The process of claim 2 wherein sodium hydroxide is employed in the reaction between the epichlorohydrin and bisphenol A and the hydroxide is added gradually to the mixture of the epichlorohydrin and bisphenol A, whereby foaming is avoided.

4. The process of claim 1 wherein said water is azeotropically distilled during the esterification.

5. The process of claim 1 wherein the fatty acid comprises soya fatty acids.

References Cited

UNITED STATES PATENTS

| | | | |
|---|---|---|---|
| 3,471,421 | 10/1969 | Vegter et al. | 260—18 |
| 2,759,901 | 8/1956 | Greenlee | 260—18 |

DONALD E. CZAJA, Primary Examiner

C. W. IVY, Assistant Examiner

U.S. Cl. X.R.

117—161; 260—33.6